United States Patent
Dunn et al.

(10) Patent No.: US 9,573,346 B2
(45) Date of Patent: Feb. 21, 2017

(54) PHOTOINITIATED OPTICAL ADHESIVE AND METHOD FOR USING SAME

(75) Inventors: William Dunn, Alpharetta, GA (US); Michael LeCave, Gainsville, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 836 days.

(21) Appl. No.: 12/505,041

(22) Filed: Jul. 17, 2009

(65) Prior Publication Data

US 2010/0043966 A1 Feb. 25, 2010

Related U.S. Application Data

(63) Continuation-in-part of application No. 12/125,046, filed on May 21, 2008.

(60) Provisional application No. 61/081,722, filed on Jul. 17, 2008.

(51) Int. Cl.
*B32B 37/12* (2006.01)
*B32B 17/10* (2006.01)
*C03C 27/10* (2006.01)

(52) U.S. Cl.
CPC ... *B32B 17/10706* (2013.01); *B32B 17/10899* (2013.01); *C03C 27/10* (2013.01)

(58) Field of Classification Search
CPC .............. B32B 37/26; B32B 17/10899; B32B 17/10706; C03C 27/10
USPC ........ 156/275.5; 428/1.5, 1.52, 354; 349/58, 349/29, 60, 59
See application file for complete search history.

(56) References Cited

U.S. PATENT DOCUMENTS

| | | | | |
|---|---|---|---|---|
| 3,823,794 A | * | 7/1974 | Bre | 181/286 |
| 4,604,444 A | * | 8/1986 | Donnadieu et al. | 528/34 |
| 4,724,023 A | * | 2/1988 | Marriott | B29C 37/006 100/137 |
| 4,766,176 A | * | 8/1988 | Lee et al. | 525/100 |
| 5,066,699 A | * | 11/1991 | Lee et al. | 524/379 |
| 5,330,262 A | * | 7/1994 | Peters | 312/140.4 |
| 5,937,611 A | * | 8/1999 | Howes | 52/745.15 |
| 6,692,986 B1 | | 2/2004 | Bayer | |

(Continued)

FOREIGN PATENT DOCUMENTS

| | | |
|---|---|---|
| EP | 1923406 | 5/2008 |
| JP | 2005029579 | 2/2005 |

(Continued)

*Primary Examiner* — Michael N Orlando
*Assistant Examiner* — Elizabeth Bradford
(74) *Attorney, Agent, or Firm* — Standley Law Group LLP

(57) ABSTRACT

A method for bonding glass components using an encapsulated photo-initiated optical adhesive, and the resulting glass assemblies produced by the same. A mixture containing a catalyst and a resin is provided where at least one of either the catalyst or the resin is encapsulated. The mixture is applied to a glass component. The encapsulated catalyst may then be exposed to ultraviolet light causing the capsules to release the portions contained therein and combine to form an adhesive. A second glass component is then placed on the adhesive so that the adhesive is interposed between the glass components and the adhesive is permitted to cure. Alternatively, the mixture may be exposed to UV light after the second glass component is placed. An exemplary method uses a frame with the first glass component to create a uniform thickness of adhesive and provide a low level of optical defects.

9 Claims, 9 Drawing Sheets

(56) References Cited

U.S. PATENT DOCUMENTS

| | | | |
|---|---|---|---|
| 7,924,362 B2* | 4/2011 | Slobodin | 349/58 |
| 2001/0043293 A1* | 11/2001 | Inoue | G02F 1/133308 |
| | | | 349/58 |
| 2004/0032638 A1* | 2/2004 | Tonar et al. | 359/265 |
| 2006/0159867 A1* | 7/2006 | O'Donnell | 428/1.5 |
| 2008/0146709 A1* | 6/2008 | Aketa et al. | 524/174 |
| 2008/0230177 A1* | 9/2008 | Crouser et al. | 156/275.5 |

FOREIGN PATENT DOCUMENTS

| | | |
|---|---|---|
| JP | 2005121940 | 5/2005 |
| JP | 2005225793 | 8/2005 |

* cited by examiner

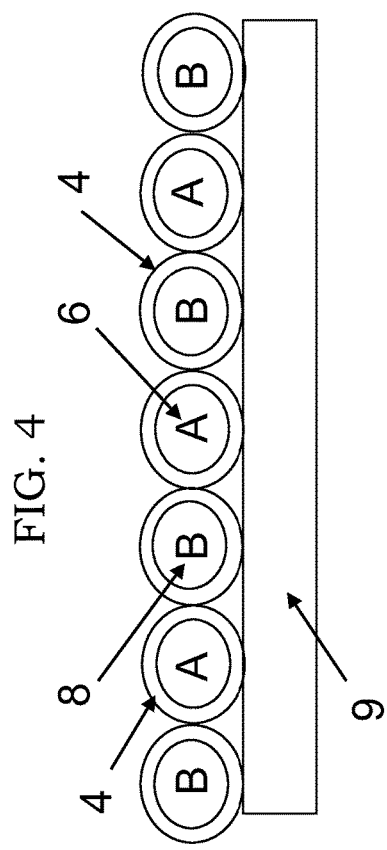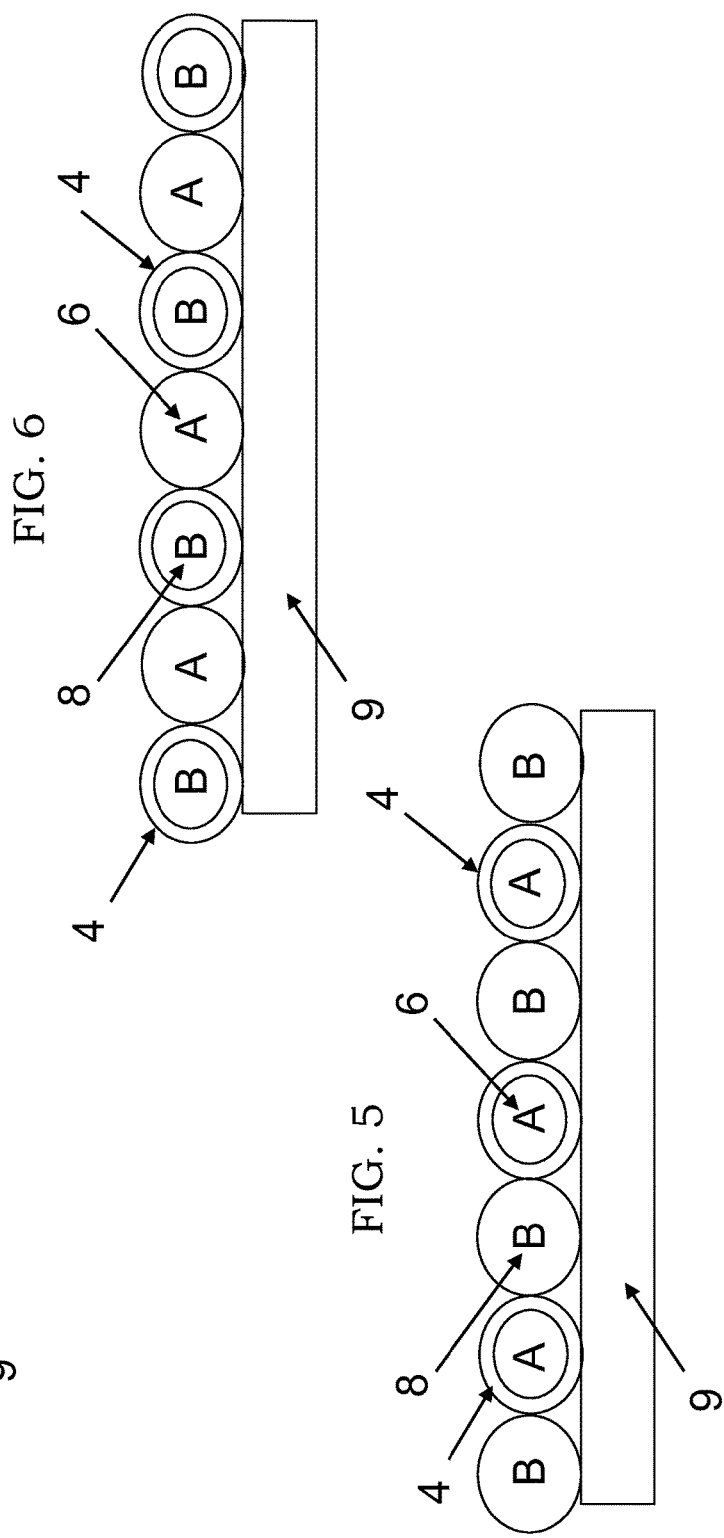
FIG. 4
FIG. 5
FIG. 6

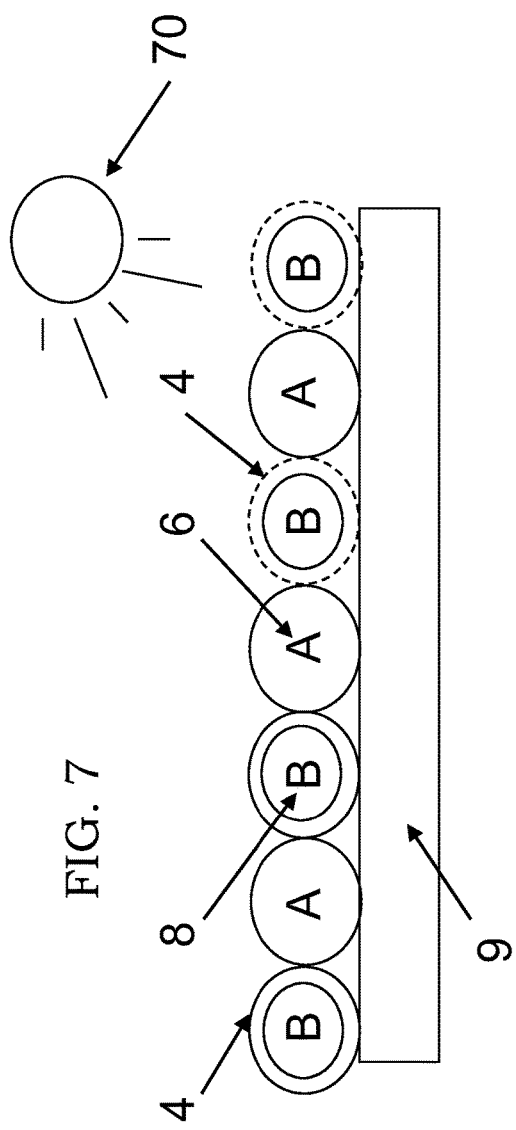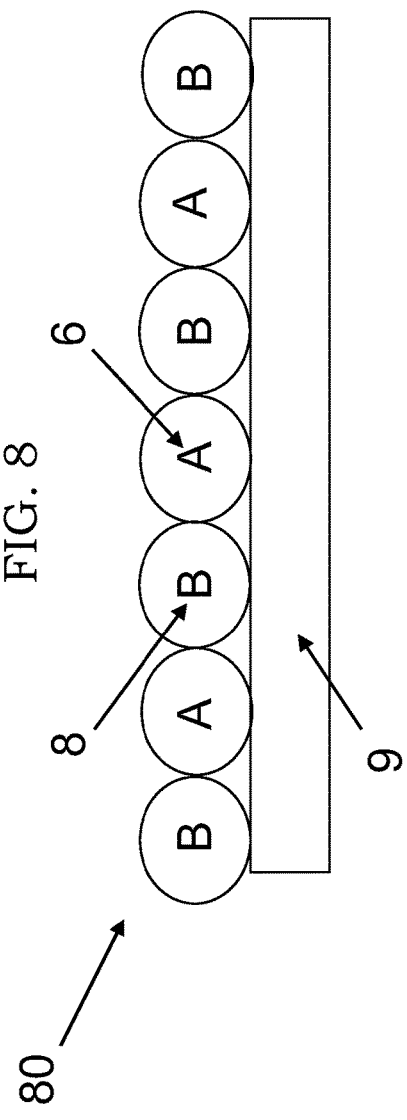

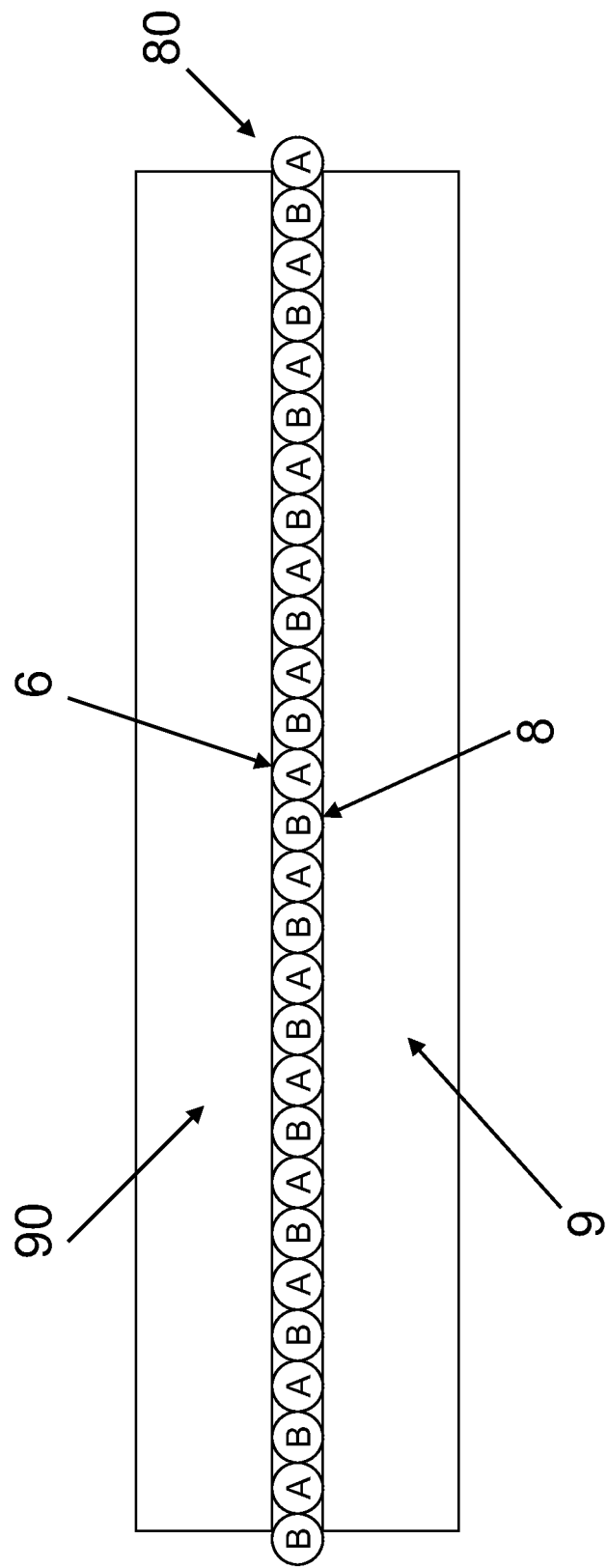

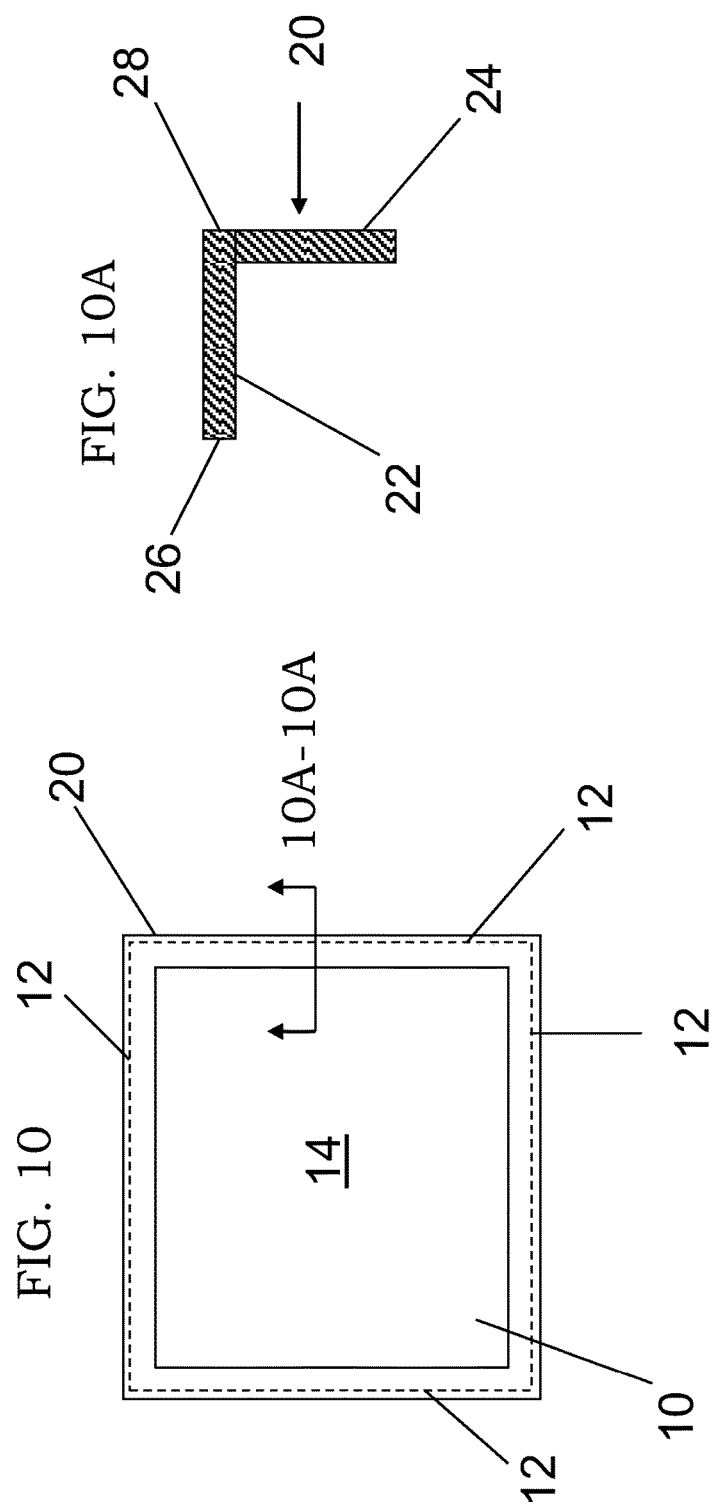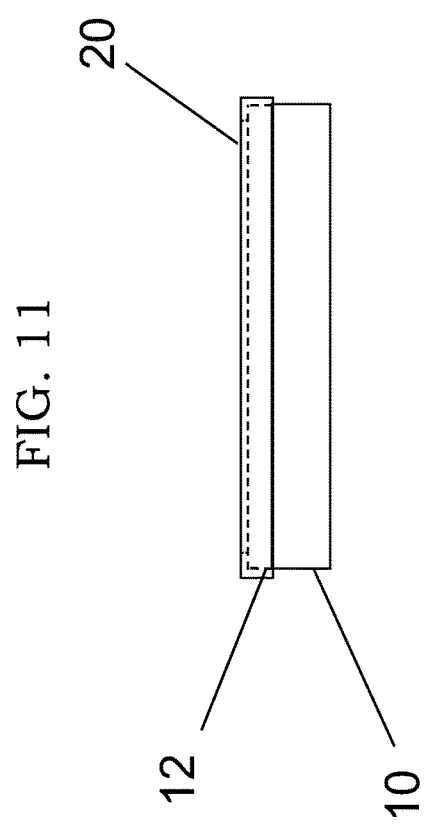

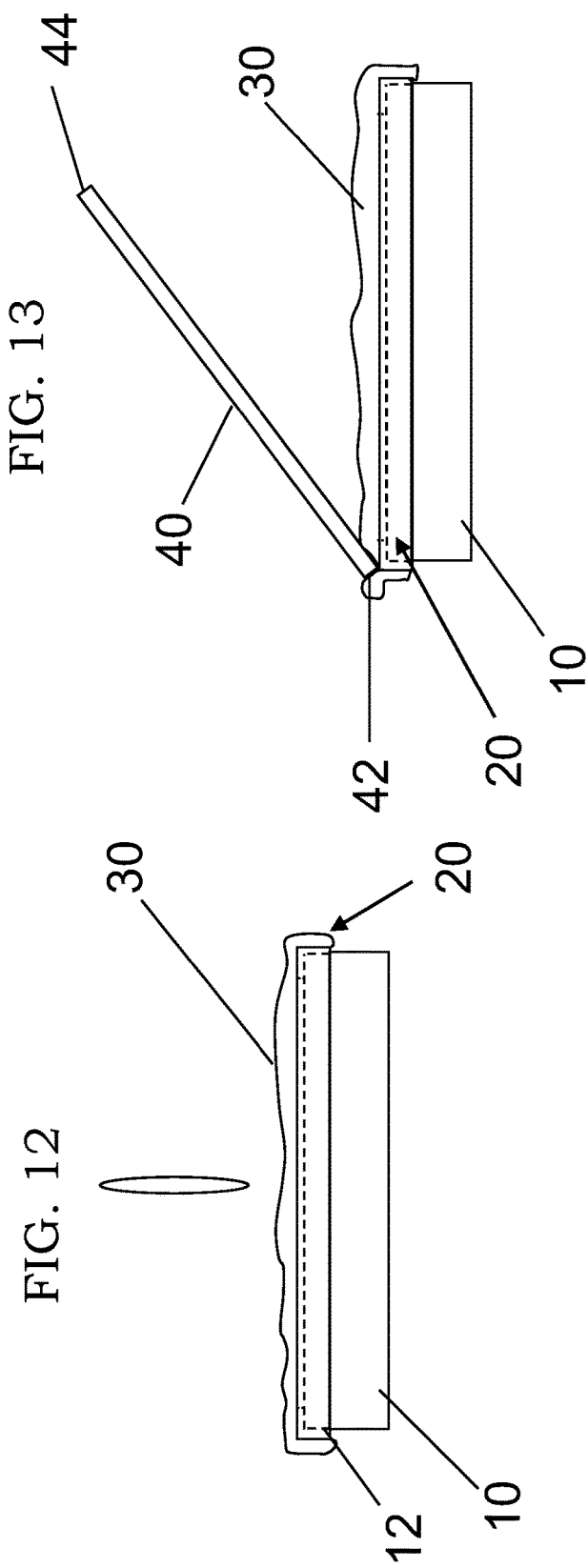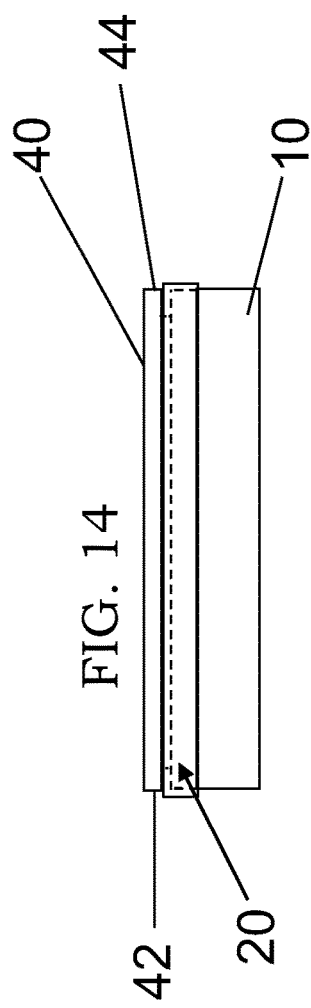

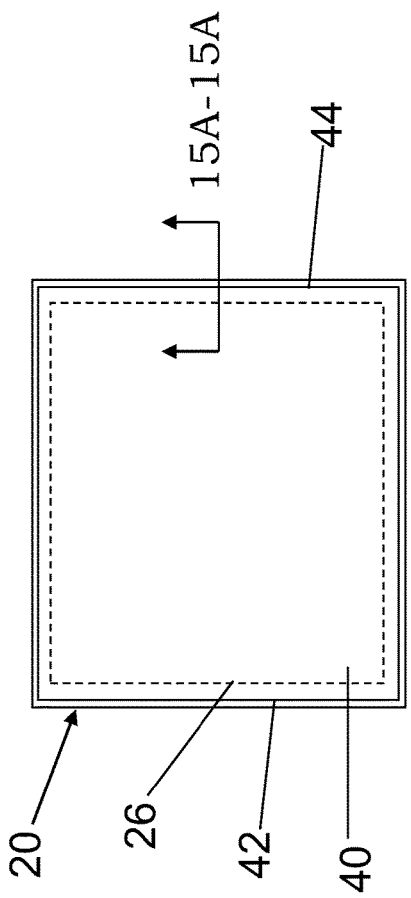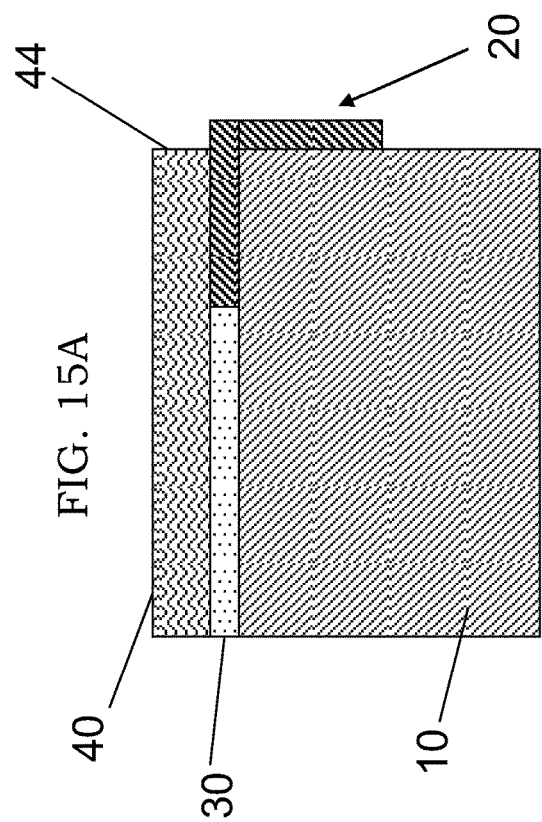

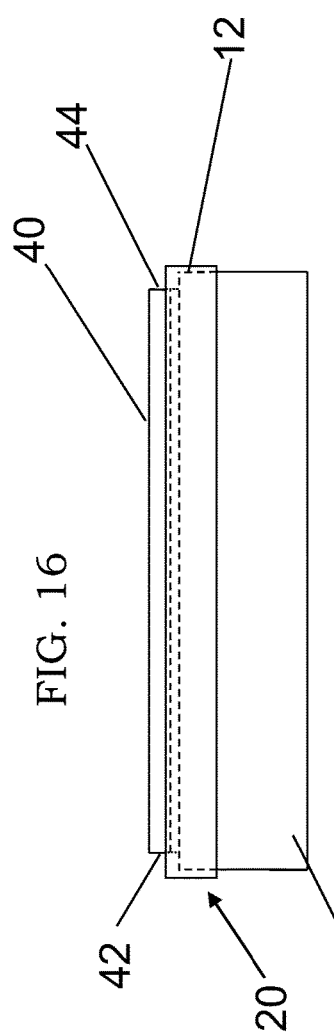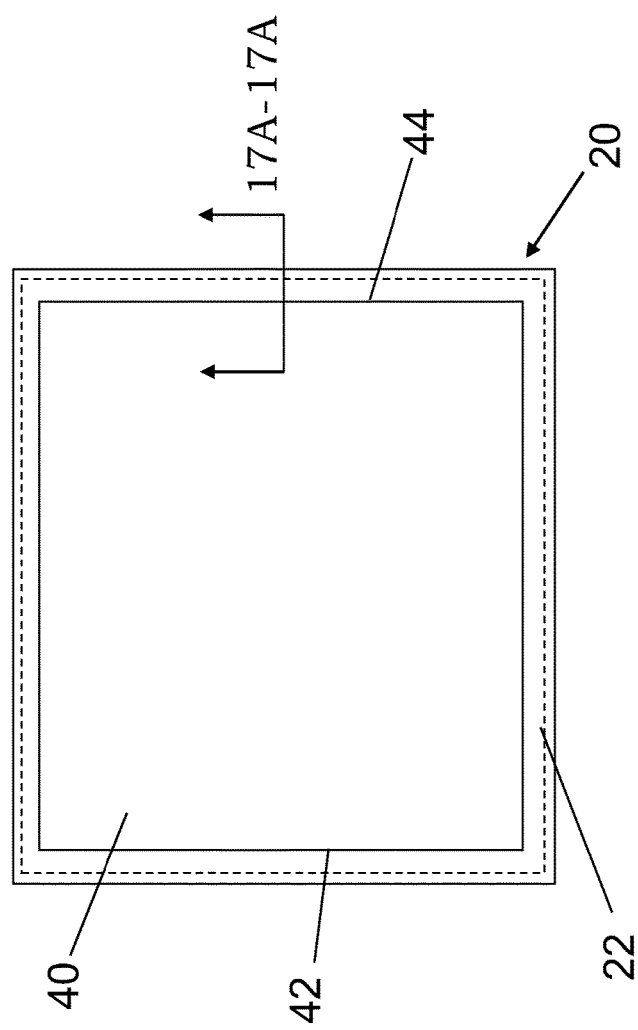

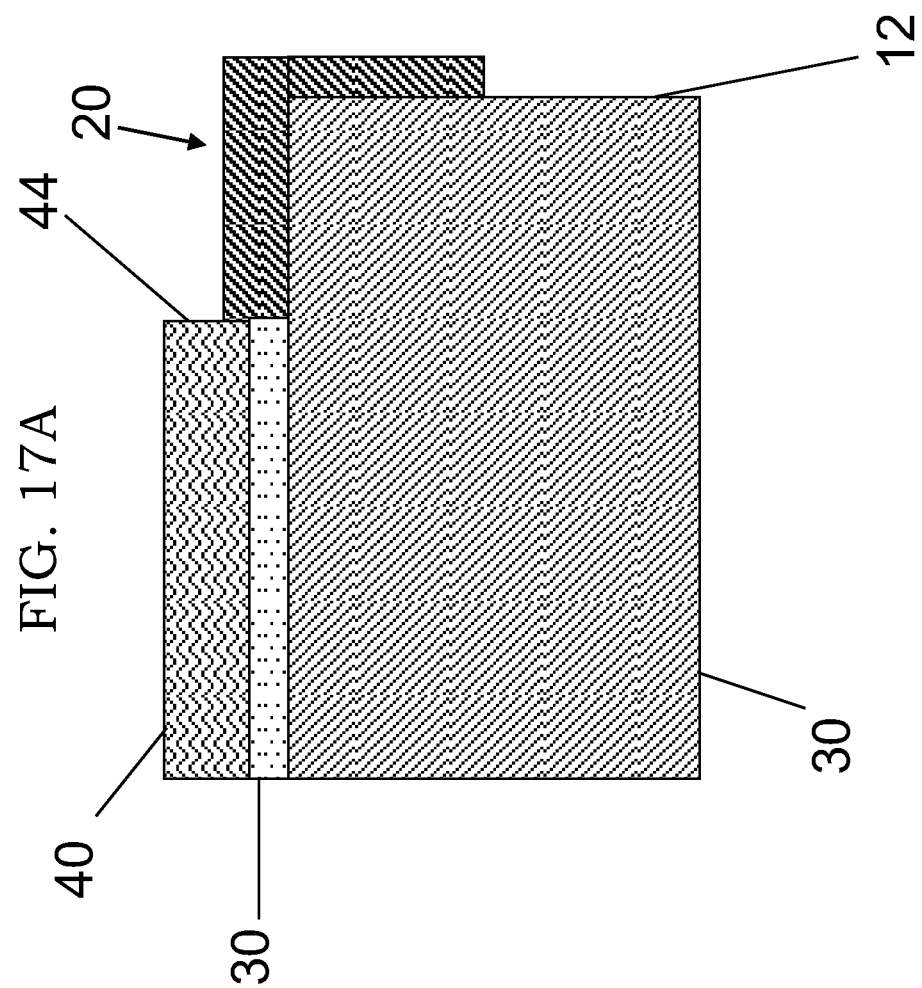

PHOTOINITIATED OPTICAL ADHESIVE AND METHOD FOR USING SAME

CROSS-REFERENCE TO RELATED APPLICATIONS

This application is a non-provisional and claims priority to provisional application No. 61/081,722 filed on Jul. 17, 2008. This application is also a CIP of non-provisional application Ser. No. 12/125,046, filed on May 21, 2008. These applications are herein incorporated by reference in their entirety.

TECHNICAL FIELD

Exemplary embodiments relate generally to optical bonding in the manufacturing of displays.

BACKGROUND AND SUMMARY OF THE INVENTION

In the manufacturing of LCD displays, it is necessary to bond glass components to one another. The bonded glass components may be used in the formation of LCD stacks, glass front plates, lamination of touch panels, and other glass features found in LCD displays. Generally, glass components are bonded using an optical adhesive interposed between the glass components. Traditional adhesives and bonding processes are time consuming and are subject to problems/defects resulting in a display unfit for consumer use.

Traditionally, adhesives for display glass components have a two part design. A first part being a resin and a second part being a catalyst. The first and second parts are then mixed together. As the first and second parts of the adhesive contact one another they undergo a reaction and begin to cure. This immediate curing significantly reduces the workable time of the mixture. The short workable time of the material may lead to various defects in the display.

One such problem with traditional methods is the formation of air bubbles in the adhesive. As the optical adhesive is interposed between two glass components, the display would be ruined if bubbles were present. Another problem that may occur during the bonding process is known as the halo effect or window framing. The halo effect may be caused by using an insufficient amount of adhesive to maintain glass component coverage during the curing phase. As the optical adhesive cures and experiences shrinking, the adhesive may pull away from the edges of the bonded glass components, resulting in both mechanical and optical failures.

Insufficient amounts of adhesive could also lead to mechanical separation of the glass components. In addition, the immediate curing may not allow for the glass components to be readjusted after coming into contact with the adhesive. When defects in the finally assembled glass are present, the only options left to manufacturers are to either dispose of the rejected components or spend large amounts of time manually removing the adhesive from the glass components. These problems are now magnified as the size of LCD displays are becoming larger and larger which necessitate the need for larger, more expensive glass components.

To eliminate some of these problems ultraviolet (hereinafter "UV") light cured adhesives have been used. UV cured adhesives may include one or two parts. The adhesive may be applied to the glass component for bonding. After the adhesive is applied, it is cured by using a UV light source to direct UV toward the adhesive. Although these adhesives may provide benefits over traditional mix cured adhesives, some problems still exist. One such problem is the increased cost of production due to the need to maintain the UV light during the curing phase. Another problem is that display features such as grid heaters, anti-reflective layers, or other devices may prevent the UV light from reaching the entire adhesive. The result may be that portions of the adhesive are not cured properly and thus weaken the bond. This weakness may result in increased mechanical separation and image distortion as a result of the uncured adhesive.

These and other problems related to traditional optical display adhesives may be eliminated through the use of the exemplary embodiments described herein. In one exemplary embodiment an encapsulated two part photo-initiated adhesive may be used to bond glass components of a display. The adhesive may comprise a first part being a resin (hereinafter "part A", "resin portions", or "resin") and a second part being a catalyst (hereinafter "part B", "catalyst portions", or "catalyst") (collectively "components"). As the adhesive resulting from the combination of resin and catalyst may be used to optically bond glass components of a display, the adhesive would preferably be substantially transparent and provide minimal image distortion. Platinum catalysts have been found to provide a suitable optical adhesive. The curing process of platinum group catalysts may be found in U.S. Pat. No. 5,548,038 filed on Mar. 14, 1995; and U.S. Pat. No. 5,661,210 filed on Sep. 25, 1996, incorporated herein by reference in their entirety.

To prevent premature contact or reaction between parts A and B, each part (or one of the parts) may be encapsulated. The term 'encapsulated' is used herein to define at least a portion of a mixture which is substantially surrounded by an envelope to prevent the portion from prematurely mixing with other portions. The encapsulated parts A and B may then be mixed together creating a viscose material. The mixture may then be applied to a glass component of a display for bonding. After a sufficient amount of the encapsulated mixture has been applied to the glass component, the mixture is exposed to a UV light source. Upon exposure to UV light, the capsules surrounding parts A and B release the resin and catalyst. Parts A and B then proceed to mix together creating an adhesive. After the adhesive has been formed it may then begin to cure. Another glass component may then be placed on the adhesive, such that the adhesive is interposed between two glass components. The adhesive may then be allowed to cure forming the bond between the glass components.

The glass components may be any component used in an electronic display or any other type of glass components which may require optical bonding. In an exemplary embodiment, the adhesive may cure simply at room temperature. In some embodiments, it may be desirable to cure the adhesive at an elevated temperature. The UV light source may be required only to release the encapsulated portions and may not be required for the actual curing of the mixed adhesive. Once the adhesive is cured, the remnants of the encapsulating element may be present.

In another exemplary embodiment, part A may be encapsulated and mixed with part B. In still other exemplary embodiment, part B may be encapsulated and mixed with part A. As the capsule shields do not react with either part A or part B, the parts are not in contact, thus not forming the adhesive. In other exemplary embodiments, the adhesive formed by parts A and B may be able to penetrate the capsule shield. In this manner, capsules not exposed to the UV light may still release their contents, and the resin or catalyst contained therein may be incorporated into the adhesive.

The described exemplary embodiments provide several advantages over traditional optical adhesives. The ability to premix the resin and the catalyst without adhesive formation increases the production time by eliminating the mixing process. In addition, the ability of the adhesive to release the contents of adjacent capsules allows a more uniform bond between the glass components.

To further ensure a lack of defects, the adhesives disclosed herein can be applied using an exemplary process. In one exemplary embodiment of this process, a first glass component having a frame is provided, the frame being in contact with the first glass component. A sealant is used to seal the edge of the frame and the first glass component. This sealant is then allowed to cure. A barrier coat is applied over the sealant. The barrier coat is then allowed to cure. The encapsulated mixture is poured over the entirety on the first glass component and frame. A second glass component is placed on the frame with one end still elevated over the first glass component. The second glass component is slowly lowered until the previously elevated edge rests on the frame, resulting in a layer of the encapsulated mixture interposed between the second glass layer and the first glass layer and the frame. The capsules may then be broken down, the components mix to create the adhesive, and the adhesive is cured. Alternatively, the capsules may be broken down prior to placing the second glass component against the frame.

In another exemplary embodiment, the barrier coat step is removed and the encapsulated mixture is poured directly onto the first glass component, sealant, and the frame. In still another exemplary embodiment, an edge of the second glass component is placed at the intersection of the first glass component and the frame, still having an edge elevated above the first glass component. The second glass component is slowly lowered until the previously elevated edge rests at the intersection of the first glass component and the frame, resulting in a layer of the encapsulated mixture interposed between the second glass layer and the first glass layer. The capsules may then be broken down, the components mix to create the adhesive, and the adhesive is cured. Alternatively, the capsules may be broken down prior to placing the second glass component against the frame.

Further features of the exemplary embodiments will be described or will become apparent in the course of the following detailed description.

BRIEF DESCRIPTION OF THE DRAWING(S)

A better understanding of the disclosed embodiments will be obtained from a reading of the following detailed description and the accompanying drawings wherein identical reference characters refer to identical parts and in which:

FIG. 4 is an exemplary embodiment of a mixture having encapsulated resin and encapsulated catalyst portions applied to the surface of a glass component for bonding.

FIG. 5 is an exemplary embodiment of a mixture having catalyst portions and encapsulated resin portions applied to the surface of a glass component for bonding.

FIG. 6 is an exemplary embodiment of a mixture having resin portions and encapsulated catalyst portions applied to the surface of a glass component for bonding.

FIG. 7 is an exemplary embodiment of a mixture having resin and encapsulated catalyst portions wherein a UV light source is applied to the mixture releasing the contents of the capsules.

FIG. 8 is an exemplary embodiment of an adhesive formed on a glass component to be bonded comprising resin and catalyst after the capsules have released their contents.

FIG. 9 is an exemplary embodiment of the adhesive interposed between two glass components so as to bond them together.

FIG. 10 is a top view of an exemplary embodiment of a glass component having a frame.

FIG. 10A is a cross-sectional view of an embodiment of the frame in FIG. 10 taken along line 10A-10A as indicated in FIG. 10.

FIG. 11 is a side view of an exemplary embodiment of a glass component having a frame.

FIG. 12 is a side view of an exemplary embodiment of a glass component coated with adhesive.

FIG. 13 is a side view of an exemplary embodiment of a first and second glass component.

FIG. 14 is a side view of an exemplary embodiment of a bonded glass product.

FIG. 15 is a top view of an exemplary embodiment of a bonded glass product.

FIG. 15A is a magnified cross-sectional view of an embodiment of a bonded glass product in FIG. 15 taken along line 15A-15A as indicated in FIG. 15.

FIG. 16 is a side view of an exemplary embodiment of a bonded glass product.

FIG. 17 is a top view of an exemplary embodiment of a bonded glass product.

FIG. 17A is a magnified cross-sectional view of an embodiment of a bonded glass product in FIG. 17 taken along line 17A-17A as indicated in FIG. 17.

DETAILED DESCRIPTION OF EXEMPLARY EMBODIMENT(S)

Figure 1:
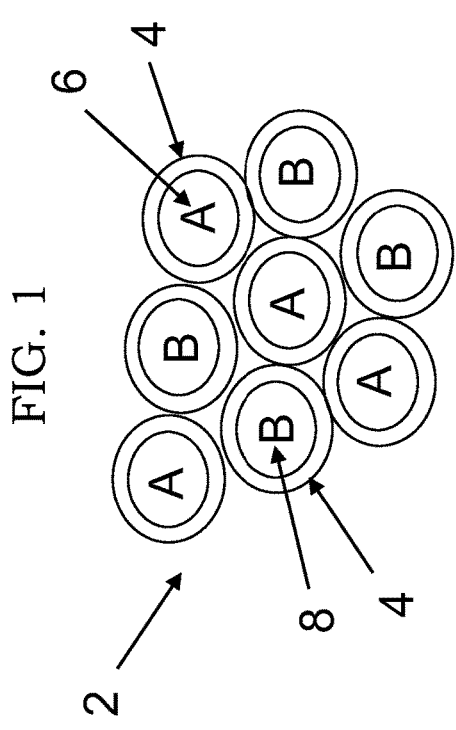
FIG. 1 is an exemplary embodiment of a mixture including encapsulated resin portions and encapsulated catalyst portions

FIG. 1 illustrates an exemplary embodiment of a mixture 2 comprising capsules 4. The capsules 4 may contain either a resin portion 6 or a catalyst portion 8. The capsules 4 may also contain any other material or additive necessary to facilitate adhesive formation between the resin portions 6 and the catalyst portions 8. The capsules 4 prevent the resin portions 6 and the catalyst portions 8 from coming into direct contact with one another. The use of the capsules 4 allows the resins portions 6 and the catalyst portions 8 to be premixed eliminating the need to mix multi-part adhesives during the bonding process.

Figure 2:
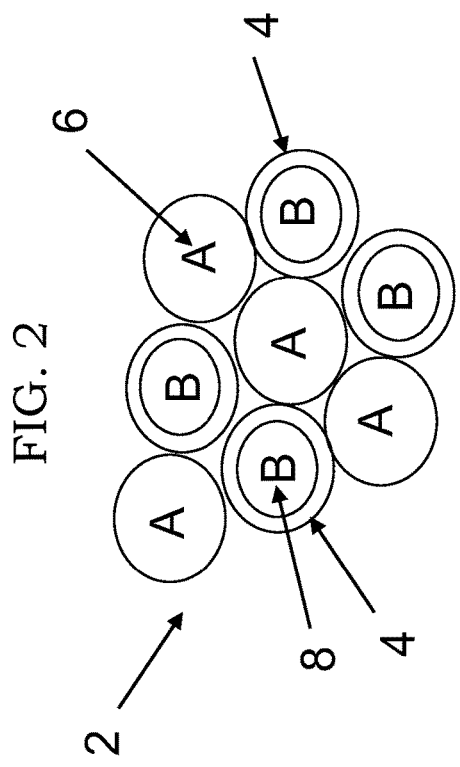
FIG. 2 is an exemplary embodiment of a mixture having encapsulated catalyst portions and resin portions.
Figure 3:
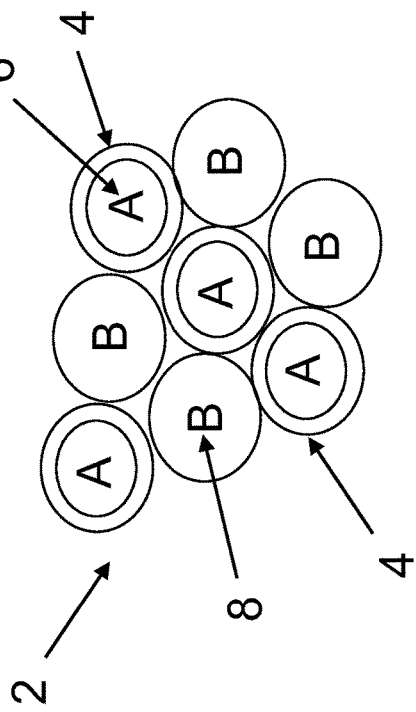
FIG. 3 is an exemplary embodiment of a mixture having encapsulated resin portions and catalyst portions.

FIGS. 2 and 3 illustrate other exemplary embodiments of the mixture 2. FIG. 2 illustrates a mixture 2 wherein only part B 8 is encapsulated. FIG. 3 illustrates a mixture 2 wherein only part A 6 is encapsulated. By providing a capsule 4 (encapsulating element) around either part A 6 or part B 8, the components remain isolated from one another. An advantage of encapsulating only one component may be to decrease the overall weight of the mixture 2 and decrease the material needed to encapsulate the components 6 and 8. Encapsulating only one component 6 or 8 may also increase adhesive formation. It should be understood by those skilled in the art, that the mixture 2 illustrated in FIG. 2 may include at least some encapsulated resin portions 6, and that the mixture 2 illustrated in FIG. 3 may include at least some encapsulated catalyst portions 8.

In other exemplary embodiments, the resin 6 and catalyst 8 may be replaced by any materials, when combined, form an adhesive or bonding material. An example of an adhesive that may be used in the claimed invention is manufactured by Momentive Performance Materials Incorporated of Albany, N.Y. (hereinafter "Momentive"). www.momentive-.com Momentive manufactures an encapsulated photo-initiated multi-part optically clear adhesive that may be used to bond in the claimed invention.

The mixture 2 is then applied to the glass component 9 to be bonded. The mixture 2 is applied in amounts sufficient to prevent defects such as the halo effect or window framing. The glass component 9 may be any display component including, but not limited to: LCD stacks, front plates, touch panels, or any other glass surfaces found in a display, such as those described in U.S. Application Nos. 61/033,064, 61/053,713, and 61/057,599 incorporated herein by reference as if fully rewritten herein. The mixture 2 may be applied to the glass component 9 in a manner such as described in co-pending U.S. application Ser. No. 12/125, 046, incorporated by reference as if fully rewritten herein. This method is discussed in detail below.

Although the mixture 2, as shown in FIG. 4 is alternating pattern of parts A 6 and parts B 8, this is merely a representation of the mixture 2 not of the actual dispersion of components 6 and 8. Although the components 6 and 8 are shown in a 1:1 ratio, it is should be understood that different ratios may be used depending on the components 6 and 8 used in the mixture 2.

FIGS. 5 and 6 illustrate other exemplary embodiments of the claimed invention. FIG. 5 illustrates a mixture 2 applied to the glass component 9 to be bonded wherein the mixture 2 includes encapsulated resin portions 6 and catalyst portions 8. FIG. 6 illustrates a mixture 2 applied to the glass component 9 to be bonded wherein the mixture 2 includes resin portions 6 and encapsulated catalyst portions 8.

As shown in FIG. 7, a mixture 2 comprising resin portions 6 and encapsulated catalyst portions 8 are applied to the glass component 9. As the encapsulated catalyst portions 8 are exposed to the UV light, the capsules 4 may begin to allow the release of the catalyst portions 8 and permit them to come into contact with the resin portions 6 in the mixture 2 (as indicated by the dashed lines). Upon contact with one another, the resin portions 6 and the catalyst portions 8 begin to form an adhesive 80 as shown in FIG. 8. In exemplary embodiments, to ensure that substantially all of the resin portions 6 and the catalyst portions 8 are in contact; the adhesive 80 may be able to penetrate the capsules 4 not exposed to the UV light and contact the resin portion 6 or catalyst portion 8 contained therein. After the adhesive is formed, it may begin the curing process.

In other embodiments, the adhesive 80 may be UV light cured, visible light cured, or cured by a moisture condensation method. In still other embodiments, the adhesive 80 may be dual curing and capable of cross-linking when subjected to UV light or visible light and/or by a moisture condensation method. In still other embodiments, the adhesive may be an RTV silicon.

As shown in FIG. 9, after the adhesive 80 has formed on the first glass component 9, a second glass component 90 may be placed on the adhesive 80 so as to interpose the adhesive 80 between the first and second glass components 9 and 90. The adhesive 80 is then allowed to fully cure. Once the adhesive has cured, the remnants of the capsule 4 (encapsulating element) may be present. It is to be understood, that exemplary embodiments may be used with any type of display where bonded glass components 9 may be used.

Although the mixture and resulting adhesive described above can be applied in many different ways, an exemplary method has been discovered which may eliminate even more defects in the final bonded glass. Although this method could be practiced with other types of adhesives, practicing the method with the mixture and adhesive disclosed above can provide a very low failure rate during the bonding process.

FIG. 10 is an elevated top view of a first glass component 10 having defined outside edges 12. The first glass component may have a first surface 14. The first glass component may have a frame 20 positioned around the outside edges 12. FIG. 10A is a cross-sectional view of the frame 20 by itself. The frame 20 may have an L-shaped cross section having a top portion 22 and a side portion 24. The top portion 22 of the frame 20 having an inside edge 26 and an outside edge 28. The top portion 22 of the frame 20 is designed to overlap the first surface 14 of the first glass component 10, such that the outside edges 12 of the first glass component 10 contact the side portion 24 of the frame 20, as illustrated in FIG. 11. The frame 20 may be a rigid material, including, but not limited to, metal. The frame 20 may have a unitary body design. In other embodiments, the frame 20 may be constructed from multiple sections.

In exemplary embodiments, the first glass component 10 may be a LCD stack. In other embodiments, the first glass component 10 may be a front plate, such as described in co-pending U.S. Application No. 61/033,064, incorporated by reference as if fully rewritten herein. In still other embodiments, the first glass component 10 may be any glass feature found in a LCD display.

To begin the bonding process an adhesive is applied to edge 26 of the frame 20 overlapping the first glass component 10 on its first surface 12, forming a frame seal. The width and thickness of the frame seal may be sufficient to form a complete seal between the edge 26 of the frame 20 and the first surface 14 of the first glass component 10. This frame seal may prevent particulate from entering any space between the top portion 22 of the frame 20 and the first surface 14 of the first glass component 10. The adhesive may then be allowed to cure at room temperature. A variety of adhesives may be used to seal the frame 20 to the first surface 12. One example of an adhesive that may be used is Dow Corning® brand product 3145 RTV Adhesive/Sealant (hereinafter "the 3145 adhesive").

After the adhesive has had sufficient time to cure, a barrier coat may be applied over the frame seal. The barrier coat may be applied over the frame seal with a brush. In other exemplary embodiments, the barrier coat may be applied using any suitable application method. The adhesive used may be an optical adhesive. In other embodiments, the optical adhesive may be index matched. One example of an adhesive that may be used is Dow Corning® brand Product, Sylgard® 527 A&B Silicone Dielectric Gel (hereinafter "the 527 adhesive"). The 527 adhesive may comprise 1 part resin to 3 parts catalyst. However, to maximize adhesion and optical performance, the 527 adhesive may comprise 1 part resin to 1 part catalyst. After the barrier coat is applied, it is allowed to cure at room temperature.

After the barrier coat has had sufficient time to cure, skirting tape (not shown in the figures) may be applied to the side portion 24 of the frame 20. The skirting tape may be aligned such that is covers the side portion 24 of the frame 20 without contacting the top portion 22 of the frame 20. The skirting tape may be any self adhesive tape. More preferably, the skirting tape may be any self adhesive tape that is easily removable. In other exemplary embodiments, a skirting tape may not be used.

The next step in the bonding process is to apply a mixture 30 over the entire first surface 14 of the first glass component 10 and frame 20, as illustrated in FIG. 12. As discussed above, this mixture 30 may contain a resin and a catalyst where at least one, or both of the parts are encapsulated. The mixture 30 may be poured so as to flood the entire first surface 14 of the first glass component 10 and cover the frame 20. The mixture 30 may continue to be poured over the first surface 14 of the first glass component 10 and frame 20 until the mixture 30 runs over the top portion 22 of the frame 20 and down the side portion 24. Any excess mixture may be recovered from underneath the first glass component 10. In some embodiments, the mixture 30 may be poured from above at approximately the center of the first surface 14. In other embodiments, the mixture 30 may be poured from multiple positions above the first surface 14 or frame 20.

After the mixture 30 has been allowed to flood the first surface 14 a second glass component 40, having a first edge 42 and a second edge 44, may be positioned for bonding. At, or before this time, a UV source may be exposed to the mixture 30 to allow the encapsulation to release one of the components so that they may begin to mix and create an adhesive. In some embodiments, the second glass component 40 may be an LCD stack, a front plate, or any glass feature found in a LCD display.

The second glass component 40 may be positioned so that the first edge 42 is in contact with the corner formed by the intersection of the top portion 22 and side portion 24 of the frame 20. The second edge 44 may be elevated above the first surface 14 of the first glass component 10, as illustrated in FIG. 13. The second edge 44 may then be slowly lowered so as to create a wave of mixture 30 (or adhesive, if already released from the capsules). As the second edge 44 of the second glass component 40 is lowered, the mixture 30 wave moves across the first surface 14. By lowering the second glass component 40 in this manner, the defects associated with bonded glass components may be eliminated. After the second edge 44 of the second glass component 40 is lowered such that the second edge 44 contacts the frame 20, and is substantially parallel to the first glass component 10, it is allowed to cure at room temperature. After curing is complete the skirting tape is removed, thus removing any excess mixture 30 from the frame 20.

If the mixture 30 has not yet been exposed to UV radiation, once the second glass component 40 has been placed, the mixture may then release the encapsulated component in order to create the adhesive and begin the curing process. As discussed at length above, in exemplary embodiments the adhesive may be able to dissolve adjacent capsules so that only a portion of the mixture would require exposure to UV radiation. In this case, the adhesive could spread throughout the mixture, dissolving capsules and forming the adhesive in a uniform and complete manner.

The finished product is illustrated in FIGS. 14, 15, and 15A. FIG. 14 is a side view of the of the bonded glass components 10 and 40. In the embodiment shown, the perimeters of the first glass component 10 and the second glass component 40 are substantially equal. FIG. 15 is a top perspective view of the bonded glass. FIG. 15A is a magnified cross-sectional view of the bonded glass. The second glass component 40 may be in contact with the top portion 22 of the frame 20. A layer of adhesive 30 is interposed between the second glass components 40 and the first glass component 10 and the frame 20. The depth of the adhesive 30 may be substantially equal to that of the thickness of the top portion 22 of the frame 20. In this manner, the depth of the adhesive 30 may be controlled by varying the thickness of the top portion 22 of the frame 20.

In other embodiments, the second glass component 40 may have perimeter dimensions less than that of the first glass component 10. This is illustrated in FIG. 16. To bond the second glass component 40 to the first glass component 10 the first edge 42 of the second glass component 40 is positioned at the intersection of the top portion 22 of the frame 20 and the first surface 14 of the first glass component 10. The second edge 44 is elevated above the first surface 14 of the first glass component 10. The second edge 44 is slowly lowered so as to create a wave of adhesive 30. As the second edge 44 of lowered, the adhesive 30 wave moves across the first surface 14. The second edge 44 is lowered so that it may nestle in the intersection of the top portion 22 of the frame 20 and the first surface 14. FIG. 17 provides a top view of the bonded glass. FIG. 17A is a cross-sectional view of the bonded glass. In this embodiment, the second glass component 40 rests on the adhesive 30 layer rather than the frame 20 as in the embodiment illustrated in FIG. 15A.

In other exemplary embodiments, the skirting tape may be applied to both the top and side portions 22 and 24 of the frame 20. This allows for the removal of any excess adhesive 30 from the all portions of the frame 20.

In still other embodiments, the 3145 adhesive used for the frame seal is replaced by an adhesive having a lower viscosity. One example of an adhesive that may be used is Dow Corning® brand product 3140 RTV Adhesive/Sealant (hereinafter "the 3145 adhesive"). The use of an adhesive having a lower viscosity than that of the 3145 adhesive may eliminate the need for a barrier coat. In exemplary embodiments, where the barrier is no longer applied, the mixture 30 may be poured onto the first surface 14 after the frame seal is cured.

Some embodiments of the present invention may involve displays other than LCD displays. An example would be plasma display or rear-projection television. An exemplary embodiment may be used with any type of display where bonded glass components may be used.

Having shown and described exemplary embodiments of the invention, those skilled in the art will realize that many variations and modifications may be made to affect the described invention and still be within the scope of the claimed invention. Thus, many elements indicated above may be altered or replaced by different elements which will provide the same result and fall within the spirit of the claimed invention. It is the intention, therefore, to limit the invention only as indicated by the scope of the claims.

What is claimed is:

1. A method for bonding glass components comprising the steps of:
   providing a first glass component having a first surface;
   placing a frame around a perimeter of the first surface of the first glass component so that the frame is in contact with the first glass component;
   sealing the first glass component and the frame with a sealant;
   allowing the sealant to cure;
   providing a mixture comprising two portions which can be combined to produce an index-matching optical adhesive, where at least one of the portions is encapsulated;
   pouring the mixture over the first surface of the first glass component and the frame;

exposing the mixture to an ultraviolet light source to release the encapsulated portion;
allowing the portions to mix and create an index-matching optical adhesive;
placing a second glass component, having a first and second edge, such that the first edge is in contact with the frame and the second edge is elevated above the first glass component;
holding the first edge in place while lowering the second edge of the second glass component until the second glass component is in contact with the frame; and
allowing the index-matching optical adhesive to cure.

2. The method from claim 1 further comprising the steps of:
applying a barrier coat to the first surface of the first component and the frame prior to pouring the mixture; and
allowing the barrier coat to cure prior to pouring the mixture.

3. The method from claim 2 further comprising the steps of:
applying skirting tape around the perimeter of the frame prior to applying the barrier coat or pouring the mixture; and
removing the skirting tape once the adhesive has cured.

4. The method from claim 1 wherein:
the first glass component is an LCD stack.

5. The method from claim 1 further comprising the steps of:
applying skirting tape around the perimeter of the frame prior to pouring the mixture; and
removing the skirting tape once the adhesive has cured.

6. The method of claim 1 wherein:
the two portions are a resin and catalyst.

7. The method of claim 1 wherein:
both the resin and the catalyst are encapsulated.

8. The method of claim 1 wherein:
only the resin is encapsulated.

9. The method of claim 1 wherein:
only the catalyst is encapsulated.

* * * * *